United States Patent
Deaton et al.

(10) Patent No.: US 6,993,498 B1
(45) Date of Patent: Jan. 31, 2006

(54) POINT-OF-SALE SERVER AND METHOD

(75) Inventors: David W. Deaton; Rodney G. Gabriel, both of Abilene, TX (US)

(73) Assignee: Midnight Blue Remote Access, LLC, Los Altos, CA (US)

( * ) Notice: Subject to any disclaimer, the term of this patent is extended or adjusted under 35 U.S.C. 154(b) by 0 days.

(21) Appl. No.: 09/360,820

(22) Filed: Jul. 26, 1999

Related U.S. Application Data

(63) Continuation of application No. 09/354,263, filed on Jul. 15, 1999.

(51) Int. Cl.
*G06F 17/60* (2006.01)

(52) U.S. Cl. .............................. 705/20; 705/14; 705/16; 705/21; 705/22; 705/26

(58) Field of Classification Search .................. 705/16, 705/20, 26, 14, 21, 22
See application file for complete search history.

(56) References Cited

U.S. PATENT DOCUMENTS

| | | |
|---|---|---|
| 2,995,727 A | 8/1961 | Quade |
| 3,316,536 A | 4/1967 | Andrews et al. |
| 3,465,289 A | 9/1969 | Klein |
| 3,528,058 A | 9/1970 | Bond |
| 3,535,682 A | 10/1970 | Dykaar et al. |
| 3,576,539 A | 4/1971 | Huber |
| 3,605,092 A | 9/1971 | Richard |
| 3,629,829 A | 12/1971 | Ordower |
| 3,657,702 A | 4/1972 | Stephenson, Jr. |
| 3,697,693 A | 10/1972 | Deschenes et al. |
| 3,719,927 A | 3/1973 | Michels et al. |
| 3,786,421 A | 1/1974 | Wostl et al. |
| 3,833,885 A | 9/1974 | Gentile et al. |
| 3,876,981 A | 4/1975 | Welch |
| 3,914,789 A | 10/1975 | Coker, Jr. et al. |
| 3,941,977 A | 3/1976 | Voss et al. |
| 3,949,363 A | 4/1976 | Holm |
| 3,959,624 A | 5/1976 | Kaslow |
| 3,987,411 A | 10/1976 | Kruklitis et al. |
| 4,002,886 A * | 1/1977 | Sundelin ..................... 235/383 |
| 4,015,701 A | 4/1977 | Templeton |
| 4,017,835 A | 4/1977 | Randolph |
| 4,027,142 A | 5/1977 | Paup et al. |
| 4,053,735 A | 10/1977 | Foudos |
| 4,053,737 A | 10/1977 | Lafevers et al. |
| 4,063,070 A | 12/1977 | Delarue et al. |
| 4,087,789 A | 5/1978 | Beery |
| 4,088,879 A | 5/1978 | Banka et al. |
| 4,091,448 A | 5/1978 | Clausing |
| 4,107,653 A | 8/1978 | Kruklitis |
| 4,109,238 A | 8/1978 | Creekmore |
| 4,114,027 A | 9/1978 | Slater et al. |
| 4,124,109 A | 11/1978 | Bissell et al. |
| 4,127,770 A | 11/1978 | Baader |
| 4,142,235 A | 2/1979 | Tadakuma et al. |
| 4,143,355 A | 3/1979 | MacIntyre |
| 4,143,356 A | 3/1979 | Nally |
| 4,148,010 A | 4/1979 | Shiau |
| 4,176,783 A | 12/1979 | Eppich |
| 4,201,978 A | 5/1980 | Nally |
| 4,208,575 A | 6/1980 | Haltof |
| 4,245,211 A | 1/1981 | Kao |
| RE30,579 E | 4/1981 | Goldman et al. |
| RE30,580 E | 4/1981 | Goldman et al. |
| 4,260,880 A | 4/1981 | Thomas |
| 4,277,689 A | 7/1981 | Thomas et al. |
| RE30,821 E | 12/1981 | Goldman |
| 4,325,117 A | 4/1982 | Parmet et al. |
| 4,332,325 A | 6/1982 | Manizza |
| 4,356,472 A | 10/1982 | Hau-Chun Ku et al. |
| 4,380,734 A | 4/1983 | Allerton |
| 4,381,494 A | 4/1983 | Wisner |
| 4,396,902 A | 8/1983 | Warthan et al. |
| 4,399,553 A | 8/1983 | Toyama |
| 4,404,649 A | 9/1983 | Nunley et al. |
| 4,425,626 A | 1/1984 | Parmet et al. |
| 4,439,670 A | 3/1984 | Basset et al. |
| 4,441,204 A | 4/1984 | Hanna |
| 4,453,074 A | 6/1984 | Weinstein |
| 4,485,300 A | 11/1984 | Peirce |
| 4,510,615 A | 4/1985 | Rohrer |
| 4,523,330 A | 6/1985 | Cain |

| Patent No. | Date | Inventor | Class |
|---|---|---|---|
| 4,547,780 A | 10/1985 | Cummins | |
| 4,547,899 A | 10/1985 | Nally et al. | |
| 4,554,446 A | 11/1985 | Murphy et al. | |
| 4,595,997 A | 6/1986 | Parmet et al. | |
| 4,617,457 A | 10/1986 | Granzow et al. | |
| 4,628,194 A | 12/1986 | Dobbins et al. | |
| 4,630,201 A | 12/1986 | White | |
| 4,670,853 A | 6/1987 | Stepien | |
| 4,672,377 A | 6/1987 | Murphy et al. | |
| 4,672,572 A | 6/1987 | Alsberg | |
| 4,673,802 A | 6/1987 | Ohmae et al. | |
| 4,674,041 A | 6/1987 | Lemon et al. | |
| 4,676,343 A | 6/1987 | Humble et al. | |
| 4,678,895 A | 7/1987 | Tateisi et al. | |
| 4,703,423 A | 10/1987 | Bado et al. | |
| 4,723,212 A | 2/1988 | Mindrum et al. | |
| 4,727,243 A | 2/1988 | Savar | |
| 4,748,668 A | 5/1988 | Shamir et al. | |
| 4,748,673 A | 5/1988 | Barre et al. | |
| 4,750,119 A | 6/1988 | Cohen et al. | |
| 4,776,021 A | 10/1988 | Ho | |
| 4,791,281 A | 12/1988 | Johnsen et al. | |
| 4,797,938 A | 1/1989 | Will | |
| 4,799,156 A | 1/1989 | Shavit et al. | |
| 4,809,351 A | 2/1989 | Abramovitz et al. | |
| 4,810,866 A | 3/1989 | Lord, Jr. | |
| 4,812,628 A | 3/1989 | Boston et al. | |
| 4,821,186 A | 4/1989 | Munakata et al. | |
| 4,825,045 A | 4/1989 | Humble | |
| 4,833,308 A | 5/1989 | Humble | |
| 4,882,675 A | 11/1989 | Nitchberger et al. | |
| 4,885,685 A | 12/1989 | Wolfberg et al. | |
| 4,887,207 A | 12/1989 | Natarajan | |
| 4,891,503 A | 1/1990 | Jewell | |
| 4,897,880 A | 1/1990 | Wilber et al. | |
| 4,908,761 A | 3/1990 | Tai | |
| 4,910,672 A | 3/1990 | Off et al | |
| 4,933,536 A | 6/1990 | Lindemann et al. | |
| 4,941,090 A | 7/1990 | McCarthy | |
| 4,947,321 A | 8/1990 | Spence et al. | |
| 4,949,256 A | 8/1990 | Humble | |
| 4,972,504 A | 11/1990 | Daniel, Jr. et al. | |
| 4,975,841 A | 12/1990 | Kehnemuyi et al. | |
| 4,982,346 A | 1/1991 | Girouard et al. | |
| 5,008,518 A | 4/1991 | Taussig et al. | |
| 5,010,485 A | 4/1991 | Bigari | |
| 5,014,324 A | 5/1991 | Mazumder | |
| 5,025,372 A | 6/1991 | Burton et al. | |
| 5,040,226 A | 8/1991 | Elischer et al. | |
| 5,053,607 A | 10/1991 | Carlson et al. | |
| 5,053,955 A | 10/1991 | Peach et al. | |
| 5,054,092 A | 10/1991 | LaCaze | |
| 5,056,019 A | 10/1991 | Schultz et al. | |
| 5,070,452 A | 12/1991 | Doyle, Jr. et al. | |
| 5,077,805 A | 12/1991 | Tan | |
| 5,091,634 A | 2/1992 | Finch et al. | |
| 5,095,195 A | 3/1992 | Harman et al. | |
| 5,117,355 A | 5/1992 | McCarthy | |
| 5,128,520 A | 7/1992 | Rando et al. | |
| 5,172,314 A * | 12/1992 | Poland et al. | 364/401 |
| 5,173,851 A | 12/1992 | Off et al. | |
| 5,179,375 A | 1/1993 | Dick et al. | |
| 5,185,695 A | 2/1993 | Pruchnicki | |
| 5,201,010 A | 4/1993 | Deaton et al. | |
| 5,202,826 A | 4/1993 | McCarthy | |
| 5,237,496 A | 8/1993 | Kagami et al. | |
| 5,237,620 A | 8/1993 | Deaton et al. | |
| 5,245,164 A | 9/1993 | Oyama | |
| 5,245,533 A | 9/1993 | Marshall | |
| 5,249,044 A | 9/1993 | Von Kohorn | |
| 5,251,152 A | 10/1993 | Notess | |
| 5,253,345 A | 10/1993 | Fernandes et al. | |
| 5,256,863 A | 10/1993 | Ferguson et al. | 235/383 |
| 5,305,196 A | 4/1994 | Deaton et al. | |
| 5,310,997 A | 5/1994 | Roach et al. | |
| 5,327,508 A | 7/1994 | Deaton et al. | |
| 5,337,253 A | 8/1994 | Berkovsky et al. | 364/479 |
| 5,353,218 A | 10/1994 | De Lapa et al. | |
| 5,388,165 A | 2/1995 | Deaton et al. | |
| RE34,915 E | 4/1995 | Nichtberger et al. | |
| 5,430,644 A | 7/1995 | Deaton et al. | |
| 5,448,471 A | 9/1995 | Deaton et al. | |
| 5,459,306 A | 10/1995 | Stein et al. | |
| 5,493,107 A * | 2/1996 | Gupta et al. | 235/383 |
| 5,592,560 A | 1/1997 | Deaton et al. | |
| 5,612,527 A | 3/1997 | Ovadia | |
| 5,612,868 A | 3/1997 | Off et al. | |
| 5,621,812 A | 4/1997 | Deaton et al. | |
| 5,632,010 A * | 5/1997 | Briechle et al. | 345/1 |
| 5,638,457 A | 6/1997 | Deaton et al. | |
| 5,642,484 A | 6/1997 | Harrison, III et al. | 395/214 |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,675,662 A | 10/1997 | Deaton et al. | |
| 5,687,322 A | 11/1997 | Deaton et al. | |
| 5,708,782 A | 1/1998 | Larson et al. | 395/214 |
| 5,710,886 A | 1/1998 | Christensen et al. | |
| 5,712,989 A | 1/1998 | Johnson et al. | 395/228 |
| 5,717,866 A | 2/1998 | Naftzger | 395/214 |
| 5,740,549 A | 4/1998 | Reilly et al. | 705/14 |
| 5,751,257 A * | 5/1998 | Sutherland | 345/2 |
| 5,761,648 A | 6/1998 | Golden et al. | |
| 5,765,143 A | 6/1998 | Sheldon et al. | 705/28 |
| 5,771,172 A | 6/1998 | Yamamoto et al. | 364/468.13 |
| 5,781,894 A | 7/1998 | Petrecca et al. | 705/14 |
| 5,793,972 A | 8/1998 | Shane | 395/200.49 |
| 5,797,132 A * | 8/1998 | Altwasser | 705/16 |
| 5,806,044 A | 9/1998 | Powell | |
| 5,819,954 A | 10/1998 | Lacriola | |
| 5,822,735 A | 10/1998 | De Lapa et al. | |
| 5,832,457 A | 11/1998 | O'Brien et al. | |
| 5,844,221 A | 12/1998 | Madigan, Jr. et al. | |
| 5,845,259 A | 12/1998 | West et al. | 705/14 |
| 5,845,529 A | 12/1998 | Moshe et al. | |
| 5,854,746 A | 12/1998 | Yamamoto et al. | 364/468.13 |
| 5,855,007 A | 12/1998 | Jovicic et al. | |
| 5,857,175 A | 1/1999 | Day et al. | |
| 5,870,714 A * | 2/1999 | Shetty et al. | 705/20 |
| 5,873,069 A * | 2/1999 | Reuhl et al. | 705/20 |
| 5,899,980 A | 5/1999 | Wilf et al. | 705/26 |
| 5,905,246 A | 5/1999 | Fajkowski | |
| 5,907,830 A | 5/1999 | Engel et al. | |
| 5,918,212 A * | 6/1999 | Goodwin, III | 705/20 |
| 5,933,813 A * | 8/1999 | Teicher et al. | 705/26 |
| 5,963,133 A * | 10/1999 | Monjo | 340/572.1 |
| 5,974,399 A | 10/1999 | Guiliani et al. | |
| 6,009,411 A | 12/1999 | Kepecs | |
| 6,012,040 A * | 1/2000 | Goodwin, III | 705/20 |
| 6,014,634 A | 1/2000 | Scroogie et al. | |
| 6,035,280 A | 3/2000 | Christensen | |
| 6,055,573 A | 4/2000 | Gardenswartz et al. | |

FOREIGN PATENT DOCUMENTS

| | | | |
|---|---|---|---|
| EP | 0 511 463 A2 | 11/1992 | |
| EP | 0 512 509 A2 | 11/1992 | |
| EP | 0708409 A2 * | 4/1996 | |
| EP | 0 708 409 A2 | 4/1996 | |
| EP | 0 709 091 A2 | 12/1996 | |
| EP | 0749091 A2 * | 12/1996 | |
| EP | 0 837 438 A2 | 4/1998 | |

| | | | |
|---|---|---|---|
| EP | 0837438 A2 | * | 4/1998 |
| GB | 1 525 928 | | 9/1978 |
| JP | 52-16941 | | 2/1977 |
| JP | 55-47560 | | 4/1980 |
| JP | 56-27468 A | | 3/1981 |
| JP | 58-155475 A | | 9/1983 |
| JP | 58-178475 A | | 10/1983 |
| JP | 59-94166 A | | 5/1984 |
| JP | 59-184965 A | | 10/1984 |
| WO | 97/08638 | * | 8/1996 |
| WO | 97/08638 | | 3/1997 |

OTHER PUBLICATIONS

Hall Daniel; "Electronic Tags Aglow in 2 Units," *Supermarket News*, vol. 37, No. 49, Dec. 7, 1997, p. 43(1).

Fensholt, Carol; "Shelf Labels Go Electronic, Merchandising Goes Dynamic," *Supermarket Business*, vol. 43, No. 5, May, 1988, p. 46(4).

Garry, Michael; "Will Supermarket Play Electronic Tag?", *Progressive Grocer*, Jul. 1991, pp. 99–104.

Zimmerman, Denise; "Fiesta Mart to Test Radio Shelf Labeling," *Supermarket News*, vol. 45, No. 6, Feb., 1995, p. 9(2).

Zimmerman, Denise; "Electronic Stinker Shock: Retailers Say Cost Is A Drawback . . . of Electronic Shelf Labels," *Supermarket News*, vol. 45, No. 38, Sep. 8, 1995, p. 17(2).

Alba, Joseph, et al.; "Interactive Home Shopping," *Journal of Marketing*, vol. 61, Jul. 1997, pp. 38–43.

Lena H. Sun, "Checking Out The Customer," *The Washington Post*, Jul. 9, 1989 (5 sheets).

"Frequent Buyer Programs Get Off The Ground," *Diary Foods*, Nov. 1989, p. 64 (printout of online version, 1 sheet).

Carlene A. Thissen, "Front–End Electronic Marketing—Frequent Shopper and Other Programs," *Food Marketing Institute*, 1991; cover page and pp. i–x and 1–70.

"Giant to Test Supermarket Cash Rebates," *Washington Post*, Jun. 14, 1989, pp. A1, A32 (printout of online version, 1 sheet).

"Grocery Stores Copy Airlines With Frequent Buyer Bonuses," *Wall Street Journal 3 Star*, Eastern Edition, Aug. 7, 1986, p. 21 (printout of online version, 1 sheet).

Michael Freitag, "In This Computer Age, Who Needs Coupons?" *New York Times*, Jun. 15, 1989 (1 sheet).

Carlene A. Thissen, "Perspectives on Electronic Marketing with Emphasis on Promotion Inside Supermarkets," *Food Marketing Institute*, 3 cover pages and pp. i–v and 1–39, May 1990.

Ronald Tanner, "A New Dimension in Marketing," *Progressive Grocer*, vol. 66, No. 5, May 1987, cover page and pp. 133–134, 136.

"S&H, Saffer Reward Frequent Shoppers," *Advertising Age*, Mar. 16, 1987, p. 22 (printout of online version, 1 sheet).

Holly Klokis, "UKROP's Tests Data Base Marketing Program—Electronic Couponing Tracks Buying Behavior of Valued Customers," *Chain Store Age Executive*, Sep. 1987 (3 sheets).

Lynette D. Hazelton, "What's New in Supermarket Promotion—Tracking Shoppers With Personal Bar Codes", *New York Times*, Jun. 18, 1989 (1 sheet).

Mollie Neal, "Quaker's Direct Hit," *Direct Marketing*, vol. 53, No. 9, p. 52, Jan. 1991 (printout of online version, 5 sheets).

"Catalina Marketing Unveils New Supermarket Continuity Programs" and "Checkout Direct," *Point of Scan: The Newsletter of Electronic Marketing*, Jan. 1991, pp. 1 and 3.

Catalina Marketing Corporation, "Frequency Programs: Cashing in on Promotions," presented at The Marketing Institute, Sep. 11, 1990, pp. 1–38.

Egon Schmidt, "Der Gläserne Verbraucher", *Electronik*, vol. 40, No. 23, Nov. 12, 1991, pp. 42–45; with English translation, pp. 1–13.

David Goldsmith, "Electronic Coupons," *Target Marketing*, North American Publishing Co., Jul. 1987 (1 sheet).

"Catalina Marketing Corp. Outmaneuvers Citicorp POS, Industry Leader Launches Frequent Shopper Program in Electronic Network of 2,500 Stores," News Release, *PR Newswire*, Jun. 16, 1989 (printout of online version, 2 sheets).

Carole Sugarman, "In–Store Computer Terminals, A Super Marketing Device," *The Washington Post*, May 28, 1986 (printout of online version, 4 sheets).

"Supermarket Trims Bad Check Losses Via On–Line Authorization," *The Data Communications User*, Jul. 1975, pp. 41–42.

"Stop Bac Check Losses—Without Lifting the Phone," *Drug Topics*, Sep. 15, 1986, p. 42 (printout of online version, 1 sheet).

"Checking Checks," *Miami Herald*, Jun. 15, 1987, p. s–17 (printout of online version, 1 sheet).

Samuel Berke, "An Analysis of Various Check Verification Services," *The Credit World*, vol. 65, No. 1, Oct. 1976, pp. 20–21; with printout of online abstract (1 sheet).

"Checking Checks at DeMoulas," *Chain Store Age Executive*, vol. 59, No. 2, Feb. 1983, pp. 18–19; with printout of online abstract (1 sheet).

Gerald Abowitz, "Electronic MICR Printing and Check Processing," *Interquest*, May, 1994, 2 cover pages and pp. vii–viii and 23–36.

"American National Standard Specifications for Placement and Location of MICR Printing—X9.13" American Bankers Association, May 4, 1990 (22 sheets).

Susan Bass and Jerrold Ballinger, "Early Use of Supermarket Scanners Brings DM and Sales Promotion Closer: Professors," *DM News*, p. 30, Mar. 1, 1989 (printout of online version, 4 sheets).

Robert C. Blattberg, "Assessing and Capturing the Soft Benefits of Scanning," a study conducted for the Coca–Cola Retailing Research Council, May 1988, 3 cover pages and pp. i–iii and 1–43.

Tina Cassidy, "Confusion Reigns Over Checking and Credit Card Law," *Boston Business Journal*, pp. 1, 19, Apr. 6, 1992 (3 sheets).

Bradley Johnson, "Catalina Adds Coupon Options," *Advertising Age*, pp. 1 and 58, Nov. 26, 1990; and printout of online version (2 sheets).

Laurie Petersen, "Catalina Launches Two New Coupon Programs," *Adweek*, Nov. 12, 1990 (printout of online version, 1 sheet).

"Catalina Readies Test," *Advertising Age*, pp. 1 and 40, Dec. 3, 1990; and printout of online version (1 sheet).

Cathy Cebulski, "P&G, Central Trust Develop Electronic Marketing System," *The Greater Cincinnati Business Record*, p. 4, Mar. 26–Apr. 1, 1990.

"Chase and Concord Join Forces To Provide Point–Of–Sale Services", Chase Manhattan Bank News Release, May 9, 1988 (3 sheets).

Jerrold Ballinger, "Coupon System Might 'Replace Mail,'" *DM News*, p. 1, Nov. 12, 1990 (printout of online version, 2 sheets).

"Death of Frequent Shopper Programs?" *Food and Beverage Marketing,* vol. 9, No. 12, cover page and pp. 5 and 10–11, Dec. 1990; and printout of online version (2 sheets).

"DIY Promos Via Video POS," *Chain Store Age Executive,* vol. 64, No. 4, cover page and pp. 76, 78, Apr., 1988; and printout of online version (3 sheets).

Stuart Elliot, "A Last Hurdle for Shoppers: The Checkout–Counter Pitch," *New York Times,* late ed., Jan. 11, 1993, Sec. D., front page and p. 7 (4 sheets); and printout of online version (2 sheets).

Sidney Feltenstein, et al., "Does Couponing Make Good Business Sense?, " *Restaurant Business Magazine,* vol. 90, No. 2, p. 152, Jan. 20, 1991 (printout of online version, 2 sheets).

Mindy Fetterman, "Capturing Customers in a Cool Economy," *USA Today,* p. 8B, Nov. 29, 1990 (printout of online version, 1 sheet).

Antonio Feuchtwanger, "Smarter Cards Think for Themselves in US Tests," *The Daily Telegraph,* p. 20, Nov. 2, 1990 (printout of online version, 1 sheet).

Rylla R. Goldberg, "MICR Handbook", Heath Printers, Inc., and Goldberg Publications, 1985, 5 cover pages and pp. 1, 3, 5 and 7–65.

Lorrie Grant, "Let Your Fingers Do Shopping . . . In Store," *USA Today,* Jul. 28, 1999, p. 3B (1 sheet); and printout of online version (3 sheets).

Martha Groves, "Frequent–Shopper Plans are Wooing Customers," *Los Angeles Times,* pp. 1 and 36–37, Oct. 1, 1989 (4 sheets).

Rob Jackson, "Package Goods' New Target: Database Marketing," *DM News,* Dec. 10, 1990 (printout of online version, 6 sheets).

Jeffrey Kutler, "Chase Forms Alliance with Terminal Vendor," *The American Banker,* May 18, 1988 (printout of online version, 2 sheets).

Linda P. Campbell, "Looking for Ways to Protect Privacy—Caller ID Brings Calls for Safeguards," *Chicago Tribune,* Sec. C, p. 21 (printout of online version, 4 sheets).

"MICR 101", Xerox Internet Site, 1998 (excerpts, 20 sheets).

Nancy Zeldis, "Targeted Coupons Hit Non–Users," *Advertising Age,* p. S–26, Apr. 27, 1987 (3 sheets).

Russ Stanton, "Notebook," *The Orange County Register,* Nov. 8, 1990 (printout of online version, 1 sheet).

Murray Raphel, "Take a Card . . . Any Card Please!", *Direct Marketing,* pp. 63–68, Feb. 1990.

"Scanning a New Horizon" *Food & Beverage Marketing,* Aug. 1989, cover page, index page, and pp. 32–33 (7 sheets).

Schedule of Presentation at May 1991 Food Marketing Institute Chicago Conference, and transcript of presentation by Robert J. Mannarino, 4 cover pages and pp. 1–14.

"Are You Thinking About the New Benefits of Scanning?", transcript of speech by Robert S. Ukrop, 1987 Food Marketing Institute Convention, May 5, 1987, 1 cover page and pp. 1–9.

Carlene Thissen & John Karolefski, "Target 2000: The Rising Tide of TechnoMarketing," *American Book Company,* 1998.

Michael Gates, "Database Marketing—The Unfulfilled Promise," *Incentive,* Sep. 1989 (5 sheets).

"What Are We Learning About Electronic Marketing," Willard Bishop Consulting, Ltd., *Competitive Edge,* pp. 1–4, Jun., 1980.

Virginia Miller, "The Vonschek: Electronic Checkwriting With Built–In Float", presented at The Supermarket Industry's Convention, Chicago, May 10, 1988, cover sheet and pages 1–5.

"Interactive POS Video Yields Instant Results", *Chain Store Age Executive,* Sep. 1988, cover sheet and pp. 52–53 and 55.

Lynn Coleman, "'Smart Card,' Coupon Eater Targeted to Grocery Retailers", *Marketing News,* American Marketing Association, Jun. 6, 1988, vol. 22, No. 12 (2 sheets).

"Getting Personal", *Retail Week,* Jun. 1, 1990 (1 sheet).

"Instant Coupons on Video Screens Set for Test Run at Finast Checkouts", *Plain Dealer,* Cleveland, Ohio, Nov. 18, 1988, p. B15 (printout of online version, 1 sheet).

"GTE Joins Proctor & Gamble and Others in New Technology Partnership", *PR Newswire,* vol. 0, No. 0, p. 1, Jun. 26, 1990 (printout of online version, 1 sheet).

"Cleveland Shoppers Save Money With New Electronic Checkout System", *PR Newswire,* p. 1, Nov. 17, 1988 (printout of online version, 1 sheet).

"Central Trust/P&G Card Links Shopper Purchases", *Bank Marketing Magazine,* Sep., 1988, p. 51 (printout of online version, 1 sheet).

"Co–op Links Scanning With Promotions", *Retail Automation,* Nov./Dec., 1988, pp. 21–22.

"Hitting the Target", *Retail Automation,* Nov./Dec., 1990, pp. 12–13.

"Trying to Get Smart", *Retail Automation,* May/Jun., 1989, pp. 9–10.

Susan Zimmerman, "Holiday Expands Electronic Couponing", *Supermarket News,* vol. 38, No. 33, Aug. 14, 1988 (2 sheets).

Laurie Petersen, "Frequent Buyer Mania", *Adweek's Marketing Week,* vol. 30, Jul. 10, 1989 (printout of online version, 5 sheets).

Zimmerman, Denise; "Fiesta Mart to test radio shelf labeling.", Supermarket News, v45, n6, p9(2), Feb. 1995.*

Hall, Daniel; Electronic Shelf tags aglow in 2 units, Supermarket News, v37, n49, p43(1), Dec. 1987.*

Garry, Michael; "Will Supermarket play electronic tag?", Progressive Groccer, Jul. 1991.*

Zimmerman, Denise; "Electronic sticker shock: retailers say cost is a drawback . . . of electronic shelf lables", Supermarket News, v45, n38, p17(2), Sep. 1995.*

* cited by examiner

*Primary Examiner*—Vincent Millin
*Assistant Examiner*—Jagdish Patel
(74) *Attorney, Agent, or Firm*—Sterne, Kessler, Goldstein & Fox P.L.L.C.

(57) ABSTRACT

A method for use in marketing includes detecting, at the point-of-sale, a plurality of Uniform Product Codes associated with respective items purchased by a customer. The method also includes transmitting, on a substantially real-time basis, the plurality of Uniform Product Code over the Internet to a remote computer connected to the Internet.

71 Claims, 4 Drawing Sheets

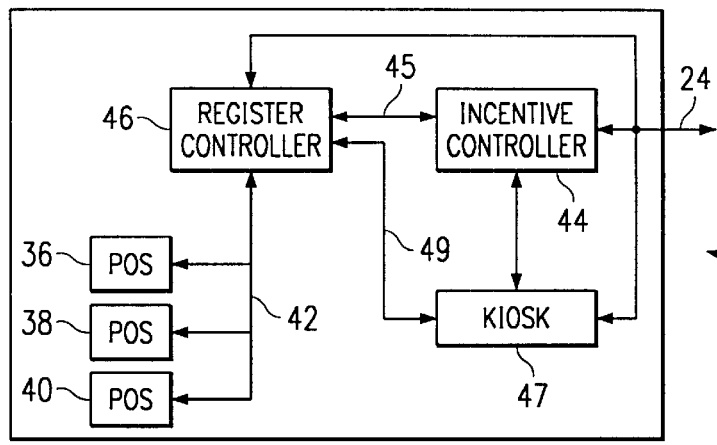
FIG. 2D
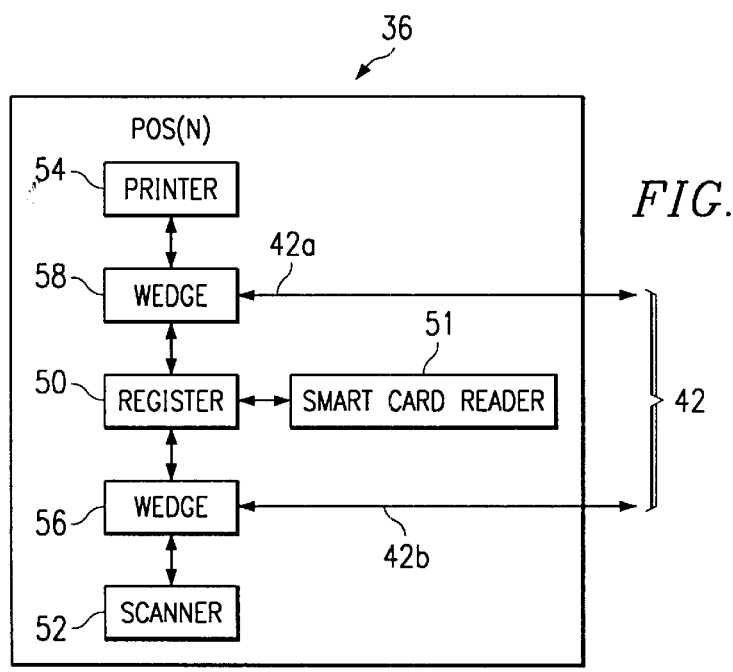
FIG. 3
FIG. 4A
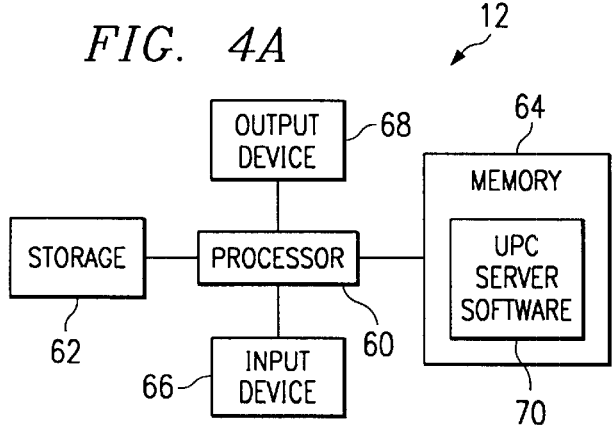
FIG. 4B
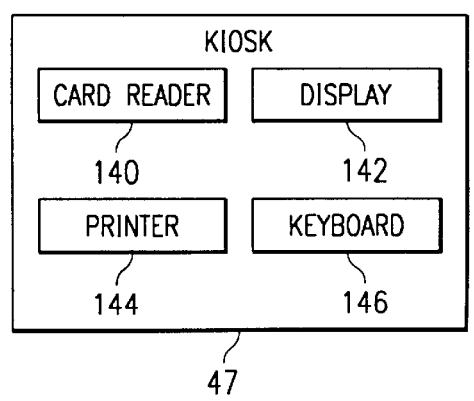

POINT-OF-SALE SERVER AND METHOD

CROSS REFERENCE TO RELATED APPLICATIONS:

This application is a continuation of U.S. application Ser. No. 09/354,263 (026656.0283), filed Jul. 15, 1999 by David W. Deaton and Rodney G. Gabriel entitled "Point-Of-Sale Server and Method", pending.

TECHNICAL FIELD OF THE INVENTION

This invention relates generally to marketing and more particularly to a point-of-sale server and method.

BACKGROUND OF THE INVENTION

Market surveys and research provide a manufacturer with information that it may use to respond to changing market conditions. For example, surveys may be conducted which ask consumers whether they favor a particular product over another. In addition, the actual past sales of a manufacturer's product may be compiled and analyzed.

Although some product information is available from these techniques, relying on conventional techniques for assessing one's place in the market may provide less than satisfactory results. For example, by the time market research informs a manufacturer that his product is underperforming in a particular market, the manufacturer may not have time to appropriately respond. Furthermore, temporary market conditions may affect the purchase of a particular manufacturer's product or its competitor's products, and these temporary conditions may no longer be applicable by the time conventional market research analysis is completed.

U.S. Pat. No. 4,972,504, entitled "Marketing Research System and Method for Obtaining Retail Data on a Real-Time Basis" to James N. Darrel, Jr., is exemplary of prior retail store marketing systems. The patent describes a system that stores retail data on a real-time basis and subsequently provides information remotely. The described system does not, however, communicate the data to a remote location, on a substantially real-time basis, allowing manufacturers or other clients to respond to market conditions rapidly; nor does the described system enable rapid response back to the point-of-sale to vary marketing parameters.

SUMMARY OF THE INVENTION

Accordingly, a need has arisen for an Internet point-of-sale server and method that addresses the shortcomings of prior methods and apparatuses.

According to one embodiment of the invention, a method for use in marketing includes detecting, at the point-of-sale, a plurality of Uniform Product Codes associated with respective items purchased by a customer and transmitting, on a substantially real-time basis, the plurality of Uniform Product Codes over the Internet to a remote computer connected to the Internet.

According to another embodiment of the invention, a system for use in marketing includes an electronic cash register for processing items at the point-of-sale. The system also includes a computer remote from the point-of-sale and connected to the Internet. The system also includes a substantially real-time communication link operable to carry information associated with the items from the point-of-sale to the Internet on a substantially real-time basis for receipt by the computer.

Embodiments of the invention provide numerous technical advantages. For example, in one embodiment of the invention, a manufacturer is provided access to real-time product purchase information. This real-time access allows the manufacturer to respond appropriately to market conditions. For example, a manufacturer may effect a price reduction in stores of products that are being purchased in less than desired quantities. In addition, a manufacturer may provide customer incentives, such as redeemable coupons, on a real-time basis to particular customers identified to the manufacturer through substantially real-time purchasing data. Such an ability allows a manufacturer, for example, to market its products to purchasers of competing products.

According to another embodiment of the invention, a manufacturer is able to receive product information associated only with its products and with its competitors products to assess the manufacturer's position in the market. According to another embodiment, a manufacturer may respond to market conditions by automatically communicating a price change through the Internet to the cash register or to electronic shelf tags located in retail stores. Another embodiment of the invention allows a manufacturer to effect a credit to a retail store for reducing the price of a manufacturer's product. Such automatic crediting facilitates the retail store's role in changing the retail price on the manufacturer's products and allows a manufacturer to market its products based upon the product's performance in the marketplace. According to another embodiment of the invention, a customer may submit a shopping list and receive price information associated with the shopping list from a plurality of different stores. Such reception allows a customer to, from the customer's home, comparison shop and select an appropriate store from which to actually purchase the desired products.

Other technical advantages are readily apparent to one skilled in the art from the following figures, descriptions and claims.

BRIEF DESCRIPTION OF THE DRAWINGS

For a more complete understanding of embodiments of the invention and the advantages thereof, reference is now made to the following descriptions taken in connection with the accompanying drawings in which:

FIG. 2D is a block diagram of a store showing alternative details of a portion of the system of FIG. 1 for providing point-of-sale information to a manufacturer;

FIG. 3 is a block diagram of the points-of-sale illustrated in FIGS. 2A, 2B, and 2C showing additional details of one embodiment of a point-of-sale;

FIG. 4A is a block diagram of the UPC server illustrated in FIG. 1;

FIG. 4B is a block diagram of one embodiment of the kiosk of FIG. 2D;

DETAILED DESCRIPTION OF THE INVENTION

Embodiments of the invention and their advantages are best understood by referring to FIGS. 1–12 of the drawings, like numerals being used for like and corresponding parts of the various drawings.

Figure 1:
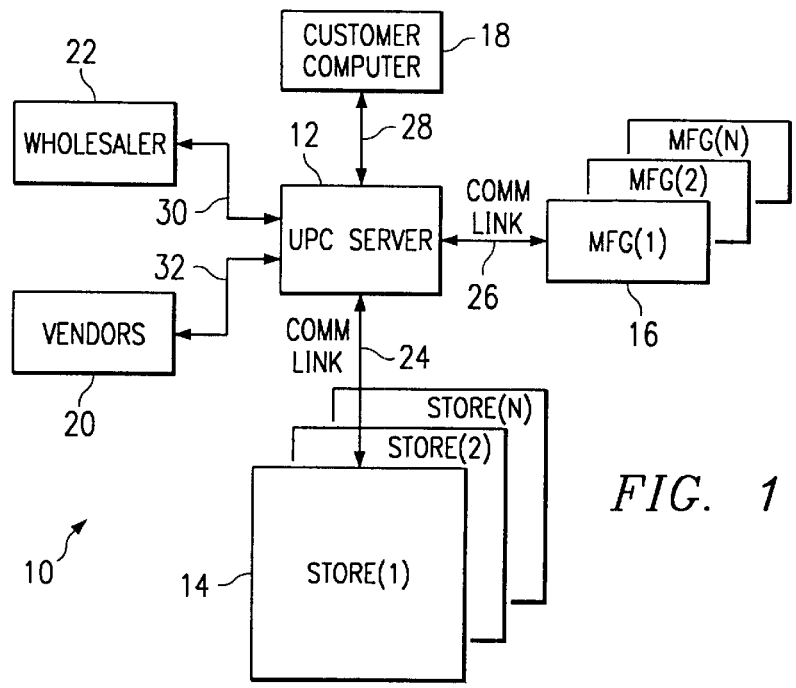
FIG. 1 is a block diagram of a system for providing point-of-sale information to a manufacturer.

FIG. 1 is a block diagram of a system 10 for providing point-of-sale information to a manufacturer 16. System 10 includes a UPC server 12 connected to one or more stores 14 by a communication link 24. System 10 also includes one or more manufacturers 16 connected to UPC server by communication link 26. In addition to manufacturers 16, vendors 20 and wholesalers 22 may also be connected to UPC server 12 by communications links 32 and 30, respectively. Vendors 20, wholesalers 22, manufacturers 16, competing retailers 14, or any other entity that subscribes to the services offered by UPC server 12 may be referred to herein as clients. System 10 also includes a customer computer 18 for accessing UPC server 12 via communication link 28. According to one embodiment of the invention, communications links 24, 26, 30, and 32 utilize the Internet.

According to the teachings of the invention, point-of-sale information obtained at store 14 is communicated on a substantially real-time basis to UPC server 12. Such point-of-sale information may include UPC codes for purchased products, UPC codes for redeemed coupons, prices of purchased products, other suitable identifications of purchased products, and other suitable data obtained at the point-of-sale, including codes not currently used. Additional point-of-sale information may include a store identification such as an Internet address, the register or lane number, and additional data such as lines of print sent to the receipt tape, smart card contents, customer IDs, and receipt lines including item description, quantity, and price, and receipt total. The entire contents of a customer's smart card may also be provided to UPC server 12. In addition, payment instrument data such as credit card number, check number, and debit card number may be transferred. Such numbers may be used as unique customer identification codes for identifying particular customers. The identification of particular customers allows determining what products a particular customer purchases, which may be used in marketing.

The communicated information is then made available on a substantially real-time basis to manufacturers 16, vendors 20, wholesalers 22, and other appropriate clients. By providing point-of-sale information on a substantially real-time basis, manufacturers 16, vendors 20, and wholesalers 22 may respond to the purchase or non-purchase of goods or services associated, respectively, with manufacturers 16, vendors 20, and wholesalers 22. For example, a manufacturer 16 may receive point-of-sale information indicating a market share far below their normal market share. In such a case, manufacturer 16 may instantly lower prices on its goods to be more competitive.

Furthermore, a manufacturer 16 may offer, on an individualized basis, incentives to a customer of store 14 based upon the customers past purchasing history, purchases made in a current transaction, a combination of these purchases, or regardless of the purchases of the customer. By providing point-of-sale information on a substantially real-time basis to, for example, manufacturer 16, individualized customer incentives may be provided by the manufacturer.

Figure 2A:
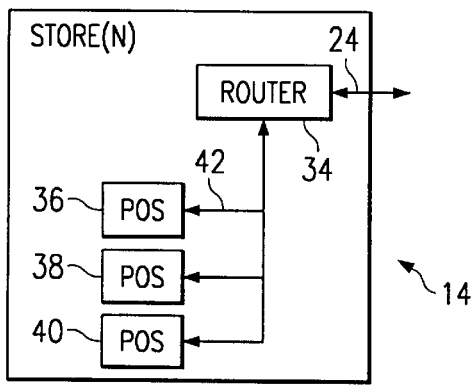
FIG. 2A is a block diagram of a store showing details of a portion of the system of FIG. 1 for providing information from the point-of-sale to a manufacturer.

FIG. 2A is a block diagram of store 14 showing details of a portion of the system of FIG. 1 for providing information from a point-of-sale 36, 38, and 40 to a manufacturer 16. Store 14 includes a plurality of points-of-sale 36, 38, and 40. Each of the points-of-sale is connected to a router 34 via a communication link 42.

Router 34 receives information from each of the points-of-sale 36, 38, and 40 on a substantially real-time basis and directs such information, on a substantially real-time basis, over communication link 24 to UPC server 12, illustrated in FIG. 1. Points-of-sale 36, 38, and 40 are described in greater detail below in conjunction with FIG. 3.

Figure 2C:
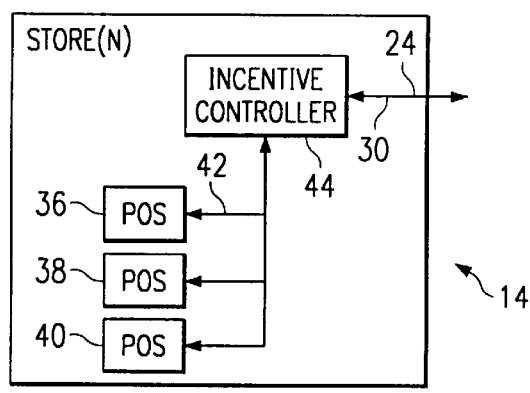
FIG. 2C is a block diagram of a store showing alternative details of a portion of the system of FIG. 1 for providing point-of-sale information to a manufacturer.
Figure 2B:
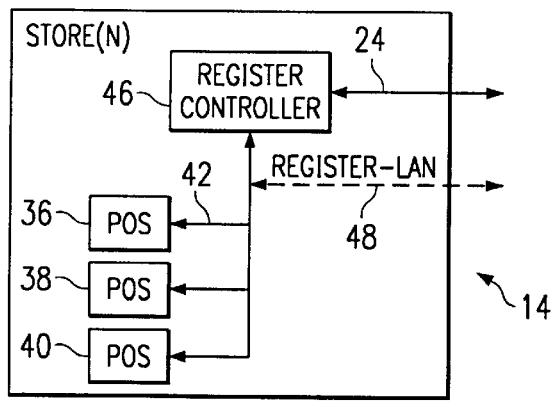
FIG. 2B is a block diagram of a store showing alternative details of a portion of the system of FIG. 1 for providing point-of-sale information to a manufacturer.

FIG. 2B is a block diagram of a store 14 showing alternative details of a portion of system 10 for providing point-of-sale information to manufacturer 16. In this embodiment of store 14, router 34, and incentive controller 44 are replaced with a register controller 46. In this embodiment, register controller 46 operates to provide information to points-of-sale 36, 38, and 40 related to product prices and descriptions and, in addition, transmits point-of-sale information to manufacturers 16 over communication link 24. In addition, register controller 46 receives information from manufacturers 16 for delivery to the customer at the points-of-sale 36, 38, 40. Such an embodiment incorporates the design of register controller 46 for reception of information from manufacturers 14 according to some standard protocol. Alternatively, a register local area network 48 may be tapped into and point-of-sale information may be provided to manufacturers 16 without designing register controller according to a particular protocol.

FIG. 2C is a block diagram of store 14 showing alternative details of a portion of system 10 for providing point-of-sale information to a client, such as manufacturer 16. In this embodiment of store 14, router 34 is replaced with an incentive controller 44. Incentive controller 44 receives point-of-sale information directly from points-of-sale 36, 38, and 40 on a substantially real-time basis over, for example, communication link 42. Incentive controller 44 then transmits the point-of-sale information on a substantially real-time basis over communication link 24 to UPC server 12. Alternatively, incentive controller 44 is associated with points-of-sale 36, 38, 40, but store 14 communicates with UPC server 12 through other means.

Whether or not connected to UPC server 12, incentive controller 44 may provide incentives, such as redeemable coupons or a written notification of a future product discount or advertising message, to customers at points of sale 36, 38, 40, recommend such incentives to manufacturer 16, or process incentives generated by manufacturer 16. Incentive controller 44 may also be used in validating product purchases in conjunction with products offered at a discount or for products for which coupons are redeemed. Incentive controller 44 may generate incentives based upon a customer's past purchasing history, a customer's present purchases, a combination of these two, or other suitable techniques.

Exemplary methodology for generating incentives by incentive controller 44 is described in U.S. Pat. 5,687,322 to Deaton et al., which is incorporated herein by reference and in U.S. patent application Ser. No. 09/320,114 to Deaton et al., entitled *Method and System for Providing Customer Incentives Utilizing Dual Customer Identifications*, which is incorporated herein by reference for all purposes. Incentive controller 44 may be formed integral with a register controller used by store 14 (not explicitly shown in FIG. 2C) that controls registers associated with each point-of-sale. For example, the register controller may provide each individual register information associating each bar code with a description and associated price.

FIG. 2D is a block diagram of store 14 showing alternative details of a portion of system 10 for providing point-of-sale information to a client, such as manufacturer 16. In this embodiment, store 14 includes a kiosk 47. Kiosk 47 allows a customer of store 14 to view and select incentives available to the customer. Details of one example of kiosk 47 are described in greater detail in conjunction with FIG. 4B. In the illustrated embodiment, kiosk 47 is connected to UPC server 12 by communication link 24; however, a kiosk may be utilized that is either not connected to UPC server 12 or that is indirectly connected to UPC server 12 through another element at store 14. Register controller 46 and incentive controller 44 are also illustrated in FIG. 2D. Register controller 46 is connected to kiosk 47 by a communication link 49.

Incentive controller 44 is connected to kiosk 47 by communication link 51. According to the teachings of the invention, point-of-sale information is communicated through communication link 24 to UPC server 12. Such information is then communicated to a manufacturer 16. In response to receiving information from the point-of-sale, manufacturer 16 may communicate, through UPC server 12, incentives to be communicated to a customer of store 14. Kiosk 47 provides a way for the incentive to be communicated to the customer.

Kiosk 47 receives an incentive over communication link 24. A customer entering store 14 may proceed to kiosk 47 to determine what incentives are available. Kiosk 47 may then provide the customer a printed redeemable coupon or communicate a future electronic discount. In the case of a printed redeemable coupon, a coupon is distributed by kiosk 47 that may be redeemed at point-of-sale 36, 38, 40. In the case of a future electronic discount, the customer is identified at kiosk 47 by, for example, a customer loyalty card, a smart card, a credit card, a debit card, or other method of identification. After identification, an incentive available to the customer is communicated to the customer by, for example, printing of the incentive on a viewable screen or on a printer. In addition to communicating the future electronic discount to the customer, kiosk 47 communicates the future electronic discount to incentive controller 44 for application when the customer is identified at point-of-sale 36, 38, 40 and the customer purchases the product associated with the future electronic discount. As an alternative, kiosk 47 may communicate incentives available to all customers, as opposed to particularly identified customers, in which case communication of individual electronic discounts to incentive controller 44 is unnecessary.

It should be understood that although a particular configuration of store 14 is illustrated in FIG. 2D, other configurations may be utilized, including combining register controller 46 and incentive controller 44 into a single integrated device, combining incentive controller 44 and kiosk 47 into a single integrated device, and eliminating redundant communication links. For example, according to one embodiment, kiosk 47 and register controller 46 may be connected to UPC server 12 solely through incentive controller 44, and register controller 46 may be connected to kiosk 46 solely through incentive controller 44.

FIG. 3 is a block diagram of particular examples of points-of-sale 36, 38, and 40 illustrated in FIGS. 2A, 2B, and 2C showing additional details of one embodiment of a point-of-sale 36. Although point-of-sale 36 includes a particular collection of items, "point-of-sale" as used herein below without a reference numeral refers to the general location at which products are purchased. Point-of-sale 36 includes an electronic cash register 50. Electronic cash register 50 receives a signal indicative of the bar code of an item scanned by a scanner 52. A scanned item may include a product for purchase, a coupon being redeemed, or other suitable item bearing a scannable code. Based upon the signal indicative of the UPC bar code, a price is associated with the scanned item as well as a description of the scanned item. The price of the item and the description are printed on a printer 54. The price and description of an item are associated with a scanned bar code through communication of register 50 with a register controller (not explicitly controlled). In the case of a single point-of-sale 36, register 50 may itself maintain a database associating bar codes with related price and product descriptions.

Between scanner 52 and register 50 is a wedge 56. Wedge 56 intercepts information from scanner 52 and provides it along communication link 42B to router 34. A wedge allows a single signal to be split into multiple signals for receipt by multiple devices or, either alternatively or in combination, allows a signal to be inserted onto an existing communication link. An example of wedge 56 is an RS-232 Y-cable used to enable two devices, for example computers, to share a single serial device; however, other suitable wedges may be utilized.

Therefore, by providing a signal indicative of the bar code of a scanned item, wedge 56 allows generation of information describing products and coupons scanned at the point-of-sale. Similarly, a wedge 58 disposed between register 50 and printer 54 receives information from register 50, allowing transmission of information along communication link 42A describing price and product information.

In addition to providing point-of-sale information, wedges 56 and 58 may receive information generated by manufacturers 16 for providing to a customer at point-of-sale 36, such as customer incentives. For example, a manufacturer may offer a customer a coupon for a product in response to the customer's purchase of particular products.

Upon receiving information describing the customer's purchase, manufacturer 16 may provide a signal through point-of-sale server 12 directed for a customer utilizing point-of-sale 36. Communication link 42A may carry such a signal to wedge 58 and it may be printed on printer 54, informing the customer of the incentive. Alternatively, a separate printer or a monitor at the point-of-sale may be used to communicate incentives to customers.

A smart card reader 51 may be connected to register 50. Smart card reader 51 receives a smart card storing an identification of a customer. The smart card also includes a memory for storing awards. Thus, through smart card reader 51, awards may be generated and applied at point-of-sale 36, 38, 40.

FIG. 4A is a block diagram of one example of UPC server 12. UPC server 12 may be implemented in many forms. In the example illustrated in FIG. 4A, UPC server 12 includes a processor 60 associated with a storage device 62 and a memory device 64. Processor 60 may also be associated with an input device 66 and an output device 68. Memory 64 includes UPC server software 70. UPC server software 70 may be executed by processor 60 while stored in memory 64. Alternatively, UPC server software may be executed from storage area 62. UPC server software 70 contains software coding sufficient to execute functions performed by UPC server 12 described in greater detail below. UPC server 12 may also be implemented in various other forms, including the use of ASICs or other hardware configurations.

FIG. 4B is a block diagram illustrating one embodiment of kiosk 47. In the illustrated embodiment kiosk 47 includes a card reader 140, a display 142, a printer 144, and a keyboard 146; however, other suitable kiosks may be used. For example, kiosk 47 may include a separate smart card reader for receiving a smart card. Display 142 may communicate incentives and provide additional information to a customer. Display 142 may be a touch-sensitive screen for receiving information from the customer, such as information related to which incentives the customer desires. Keypad 146 also allows a customer to provide information to kiosk 47. For example, a customer may provide a name, address, telephone number, or other suitable indication of the customer's identity. Card reader 140 may also be used to identify a customer by receipt of a customer card, credit card, debit card, or other instrument from which the customer's identity may be determined. Printer 144 may be used in conjunction with display 142 to generate a shopping list of items for which the customer will receive discounts when the items are purchased. Kiosk 47 may be used in conjunction with distribution of incentives as described above in conjunction with FIG. 2D.

Figure 5:
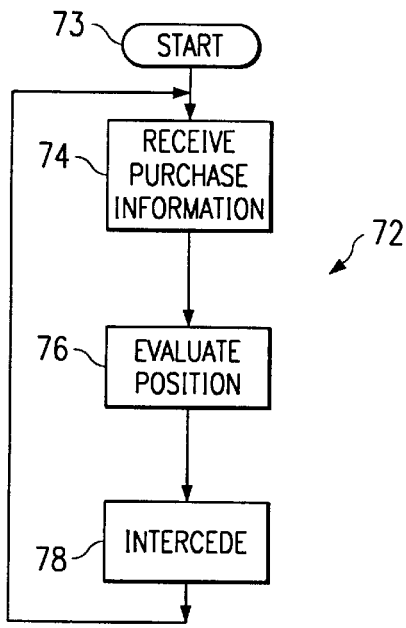
FIG. 5 is a flow chart illustrating a summary of steps performed in conjunction with the system of FIG. 1 to allow a plurality of manufacturers to market their products to customers.

FIG. 5 is a flow chart illustrating a summary of steps performed in conjunction with system 10 to allow a manufacturer 16 to market its products to customers of store 14. The process begins at a step 73. At a step 74, manufacturer 16 receives point-of-sale purchase information from UPC server 12. Point-of-sale purchase information is provided to UPC server 12 from store 14 through communication link 24. According to one embodiment, communication link 24 provides Internet access to store 14 and therefore, connects UPC server 12 to store 14 via the Internet. According to the embodiment illustrated in FIG. 2A, such point-of-sale information is provided from individual points of sale 36, 38, 40 to a router 34 for transmission along communication link 24. In the embodiment illustrated in FIG. 2B, such point-of-sale information is provided by points of sale 36, 38, and 40 to an incentive controller 44, for communication over communication link 24 to point-of-sale server 12. In the embodiment illustrated in FIG. 2C, such point-of-sale information is provided by points of sale 36, 38, and 40 to either a register controller 46 for communication over communication link 20 to UPC server 12, or by eavesdropping by UPC server 12 on a register local area network 48 associated with store 14. In each of the above embodiments, according to one example system, each of the points of sale 36, 38 and 40 provide information to respective controllers or to UPC server 12 through the use of wedges, such as wedges 56 and 58. According to another example system, wedges 56, 58 are not utilized and product purchase information is obtained from a register controller, such as register controller 46, incentive controller 44, or from register LAN 48.

After point-of-sale information is received by UPC server 12, point-of-sale information is transmitted on a. substantially real-time basis over communication link 26 to manufacturer 16. In the embodiment illustrated in FIG. 1, communication link 26 is an Internet connection between manufacturers 16 and UPC server 12; however, other suitable connections may be established including satellite links, wireless communications, phone lines, and dedicated lines.

At a step 76, manufacturer 16 may evaluate the point-of-sale information it has obtained from UPC server 12. Evaluation of such information may allow a manufacturer 16 to assess whether its products are selling according to desired parameters. For example, a manufacturer may assess the market share of a particular product in a particular geographic region.

After evaluating the position of its products at step 76, a manufacturer may intercede at step 78 to attempt to effect increased purchases of the manufacturer's products at step 78. Such intercession may take a variety of forms. For example, manufacturer 16 can initiate offers to customers by e-mail, can initiate offers through the use of kiosks conventionally located in stores such as retail stores, can initiate offers for immediate communication at the point-of-sale, can communicate notification of a future electronic discount at the point-of-sale, manufacturer 16 may take other applicative action.

Generation of such incentives may include the methodology described in U.S. Pat. 5,687,322 to Deaton et al, including generating incentives based on the purchases of a customer, including examination of the products purchased by the customer in past and/or present transactions or the customer's economic impact on manufacturer 16, as measured by the volume of purchases by a particular customer. Such volume may be measured by dollar amount or other suitable criteria. Generation of incentives to individual customers may also be performed without reference to the market position of any particular product of a manufacturer 16. In each of these examples, UPC server 12 may act as an intermediary to maintain privacy concerns of particular individuals shopping at store 14. Thus, UPC server 12 can block, or prevent, providing of any of these types of offers to the customer. UPC server 12 may act as an intermediary by maintaining, and not providing to manufacturer 16, information that would allow manufacturer 16 to determine the identity of any individual. For example, e-mail addresses and physical addresses may be maintained only by UPC server 12 and not provided to manufacturers 16.

In addition to providing incentives to the individual customers, a manufacturer 16 may intercede by, in response to assessing its position in the market on a substantially real time basis, effect a price change in particular products. Such a price change may be effected through traditional techniques or may utilize UPC server 12 to communicate to retail store 14 that the manufacturer 16 is implementing a price reduction. Such price reduction could include an automatic discount on the selling price at store 14, which would be subsidized by manufacturer 16, or may involve a direct discount to the retail store with a subsequent price change in the selling price at the store 14 determined by the operator of store 14.

Furthermore, a manufacturer may communicate incentives to customers independent of the current market position of its products. Information that may be transmitted to store 14 by UPC server 12 may include electronic discounts, lines of print for the register printer or an auxiliary printer for communication of messages to the customer, information sent back for writing to the customer's smart card to update things such as point totals, purchase profiles, etc.

Demographics may also be introduced to provide real-time purchase data based on national, regional, state, city, neighborhood, and even store levels. Purchases by identified customers may be presented to manufacturers based on, for example, customer's total spending levels; customer's level of spending on that manufacturer's products; customer's level of spending on competitor's products; customer's level of spending on a department, product class, or product family; and customer's level of spending on complimentary or companion products, and other customer data such as size of the household, household income, etc.

The flow of information from UPC server 12 to any individual manufacturer 16 may be based upon particular information subscribed to by manufacturer 16. For example, a particular manufacturer 16 may wish to receive only information regarding the purchase of the manufacturer's products and the purchase of the manufacturer's competitor's products. Thus, UPC server 12 may perform a filtering function in which only subscribed to data is transmitted to any particular manufacturer 16. Such filtering is described in greater detail below in conjunction with FIG. 6.

Figure 6:
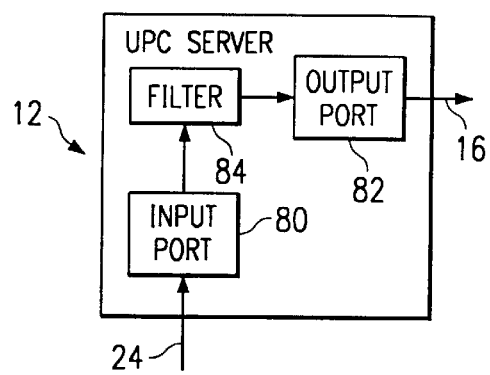
FIG. 6 is a block diagram illustrating an example server of the system of FIG. 1, showing units for receiving information, filtering that information, and distributing the filtered information to appropriate manufacturers.

FIG. 6 is a block diagram illustrating additional details of one example of UPC server 12 showing UPC server 12, showing units for receiving information, filtering that information, and distributing the filtered information to appropriate manufacturers 16. In the illustrated embodiment, UPC server 12 includes an input port 80 and an output port 82. Input port 80 represents circuitry and any associated software utilized to receive point-of-sale information from store 14 over communication link 24. Thus, although a limited number of stores 14 are illustrated in FIG. 1, input port 80 may be configured to receive point-of-sale information for all stores associated with UPC server 12. The point-of-sale information received by input port 80 is provided to filter 84. Filter 84 contains circuitry and/or software that identifies the type of point-of-sale information and associates that type of point-of-sale information with particular subscribing manufacturers 16. Such information is provided to an output port 82 for transmission to a particular manufacturer 16. By providing filtering capabilities, UPC server 12 alleviates a manufacturer 16 from having to process large amounts of information that is unrelated to the manufacturer's business.

Figure 7:
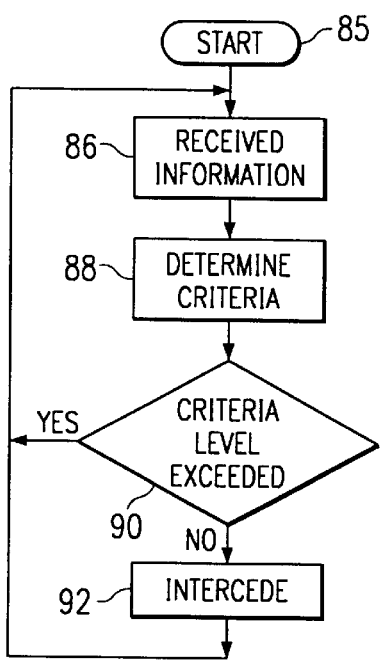
FIG. 7 is a flow chart illustrating automatic response by a manufacturer in response to the meeting of certain thresholds relating to the manufacturer's products.

FIG. 7 is a flow chart illustrating the automatic response by a manufacturer 16 in response to the meeting of certain thresholds relating to the manufacturer's products.

The process begins at step 85. At a step 86, information is received by manufacturer 16 as described above relating to a particular product. At a step 88, it is determined what criteria will be applied to assessing the position of the manufacturer's products. For example, the market share of the particular product may be the criteria used. As another example, the volume of sales of a particular product may be used as a criteria. As a third example, the relative pricing of the particular product in comparison to its competitor may be used as a criteria. Furthermore, changes in each of these criteria over a particular period of time may be used as a criteria. For simplicity of description, a market share criteria is adopted for the remainder of this example. A market share of 25% is considered desirable and a market share of less than 25% is considered undesirable.

At a step 90 a determination is made of whether the criteria level is exceeded. In this example, if the market share of the particular product manufactured by manufacturer 16 has a market share greater than 25%, a manufacturer 16 is satisfied and continues to receive information to remain abreast of the success of the manufacturer's product. If the market share is less than 25% then intercession is required at step 92, and manufacturer 16 utilizes one of many available options for attempting to increase the criteria level, which in this case is market share. By having the opportunity to receive information on a substantially real-time basis regarding product pricing and purchases, manufacturers 16 may intercede in a timely fashion in a manner not otherwise available.

According to another aspect of the invention, UPC server 12 operates to concentrate messages received from manufacturer 16 for delivery to customers of store 14. In order to effect the purchase of a manufacturer's product, manufacturer 16 may desire to provide incentives to customers of store 14, such as coupons or e-mails.

According to one embodiment, UPC server 12 includes circuitry and/or software 70 that operates to concentrate promotional messages into a common e-mail so that customers of store 14 are not inundated with a plurality of undesired promotional e-mails. According to this embodiment, manufacturer 16 transmits a promotional e-mail to UPC server 12 for receipt by a particular customer of store 14. Manufacturer 16 identifies the customer of store 14 by some sort of identification number. UPC server 12 also receives a plurality of other promotional messages for receipt by the same customer of store 14, but from different manufacturers 16. UPC server 16 consolidates these e-mails into a common e-mail that is sent to an e-mail address known by UPC server 12 but not by manufacturers 16. This process helps maintain the privacy of the customer of store 14 and also reduces the number of e-mails received by the customer.

Figure 8:
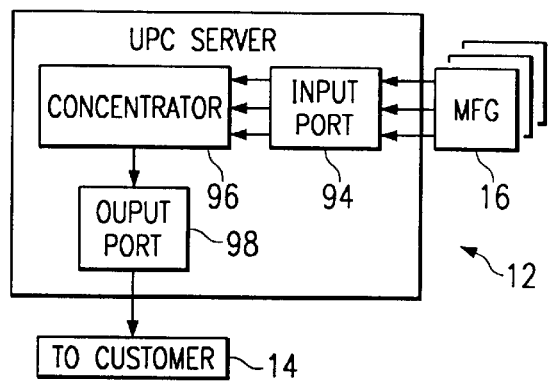
FIG. 8 is a block diagram of an example UPC server containing circuitry and/or software operable to concentrate e-mails provided by a plurality of manufacturers for receipt by a customer of a store.

FIG. 8 is a block diagram of an example UPC server 12 containing circuitry and/or software operable to concentrate e-mails provided by a plurality of manufacturers 16 for receipt by a customer of a store 14. In this embodiment, UPC server 12 includes an input port system 94 for receiving a plurality of e-mails from a plurality of manufacturers 16. These e-mails are provided to a concentrator system 96. Concentrator system 96 consolidates a plurality of e-mails destined for a common user into a common e-mail message. This common e-mail message is provided to output port system 98, which in turn transmits the common e-mail to a customer of store 14. In this manner, UPC server 12 also operates to facilitate transmission of promotional messages to the customer, in addition to providing a means of communication of point-of-sale data to a manufacturer on a substantially real-time basis.

Figure 9:
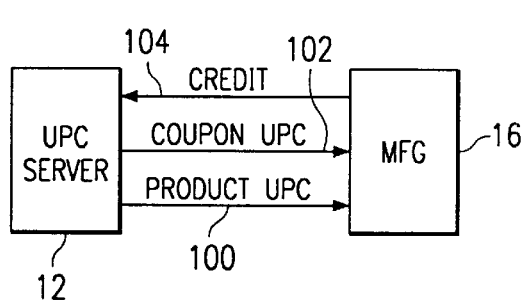
FIG. 9 is a block diagram illustrating the use of a UPC server in facilitating coupon redemption validation and electronic crediting.

According to another aspect of the invention, UPC server includes circuitry and/or software for facilitating both coupon redemption validation and electronic settlement mechanisms for incentives offered by the manufacturer, as illustrated in FIG. 9.

FIG. 9 is a block diagram illustrating the use of UPC server in facilitating coupon redemption validation and electronic crediting. Traditionally, coupons are marked with a Uniform Product Code and thus, bar codes scanned from a coupon may also be provided to manufacturer 16 by UPC server 12 as indicated by arrow 102. Thus, manufacturer 16 is able to receive both the product Uniform Product Code and the Uniform Product Code associated with a coupon for that product. Therefore, the manufacturer may verify the proper redemption of a manufacturer coupon and provide an appropriate credit to store 14. Such redemption verification includes verifying that the product associated with the coupon is actually purchased. Verification may also include verifying the price at which the product was purchased. In addition, for incentives associated with a particular customer, the identity of the person receiving a discount may be verified. Alternatively, UPC server 12 may include circuitry and/or software 70 for also performing this validation and for providing manufacturer 16 of a summary of the number and amount of coupons redeemed for the particular manufacturer. In either event, once verified manufacturer 16 may effect a credit, demonstrated by arrow 104, directed to store 14 in the amount of the redeemed coupons.

Figure 10:
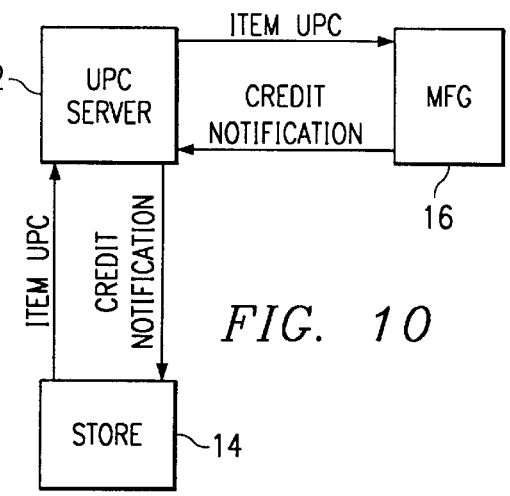
FIG. 10 is a block diagram showing an additional embodiment of the invention in which a UPC server facilitates electronic settlement of credit and debits between a store and a manufacturer.

FIG. 10 is a block diagram showing an additional embodiment of the invention in which UPC server 12 facilitates electronic settlement of credit and debits between store 14 and manufacturer 16. According to one aspect of the invention, manufacturer 16 may respond in a substantially real-time basis to market developments to attempt to adjust the relative market share of a manufacturer's product, or attempt to adjust to other market conditions to attempt to generate desirable product sales of the manufacturer's products.

One adjustment made by manufacturer 16 is the downward adjustment of price at which the manufacturer's product will be sold. Manufacturer 16 may effect such a downward adjustment in price by specifying to store 14 the price at which the store should sell the product and by granting a credit to the store 14 for each such product purchased. Such a method for adjusting to market conditions may require a settlement mechanism between manufacturer 16 and store 14 to account for the lower price offered by store 14 at the request of manufacturer 16. UPC server 12 therefore, may receive from store 14 Uniform Product Codes and the price information that is also transmitted to manufacturer 16. Manufacturer 16 may then be able to assess the number of its products sold at a discount and the amount of discount owed store 14. In response, manufacturer 16 may provide a credit notification through UPC server 12 for transmission to store 14, thus effecting electronic settlement of temporary price reductions offered by a manufacturer and implemented by a store. Such electronic settlement may also be utilized to compensate store 14 for redeemed coupons or application of other discounts effected at the initiative of manufacturer 16.

Figure 11:
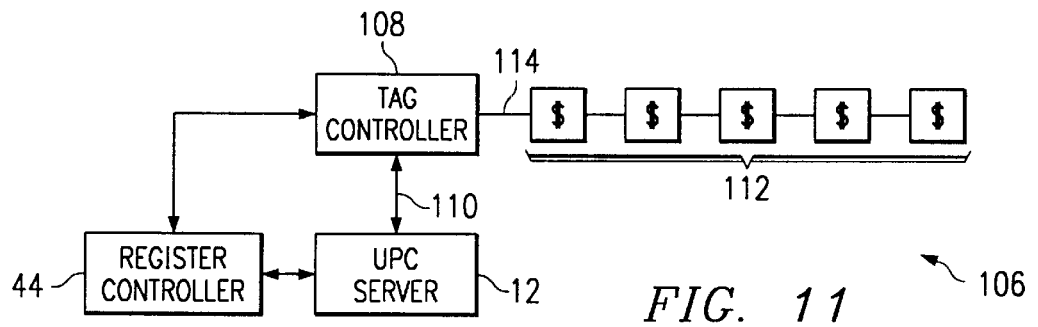
FIG. 11 is a block diagram of a system for remotely effecting a product price change in a retail store.

FIG. 11 is a block diagram of a system 106 for remotely effecting a product price change in a retail store. System 106 includes a tag controller 108 connected to a plurality of electronic tags 112 via a communication link 114. According to one embodiment, communication link 114 comprises an FM transmitter for transmitting to electronic tags 112 the price to be displayed on each individual electronic tag 112. According to another embodiment, communication link 114 comprises a suitable conductive transmission medium, such as electrical wires.

The system also includes a UPC server 12 connected to tag controller 110 via a communication link 110. According to one embodiment, tag controller 108 is located in a store, such as store 14, that is connected to UPC server 12.

According to the same embodiment, communication link 110 utilizes the Internet. Communication link 110 allows UPC server 12 to provide an updated price for an item, such as the manufacturer's product, in response to the determination by the manufacturer based on substantially real-time data that it would be desirable to effect a change in price of the manufacturer's product. UPC server 12 communicates a signal indicating such a change to tag controller 108. Tag controller then provides such a signal along communication link 114 to a particular electronic tag 112 associated with the manufacturer product. Electronic tags 112 may be positioned, on a shelf near the location of the product. UPC server 12 may also communicate the price change to store 14 so that store 14 may maintain for its own records the adjusted price and verify any credits provided by manufacturer 16.

Therefore, manufacturer 16 may remotely effect a price change in one of its products in response to the analysis of data regarding the sale of its products or its competitors products. In addition, tag controller 108 may also provide price information to UPC server 12 so that the price information received from points of sale 36, 38 and 40 may be verified against the prices displayed by the electronic tags 112 in store 14.

Further, UPC server 12 may communicate the price changes to register controller 46 to maintain consistency between electronic tags 112 and register controller 46.

Alternatively, register controller 44 may communicate directly with register controller 44, with register controller 44 providing the price change to tag controller 108.

In addition to providing product purchase and price information at the point-of-sale to the manufacturer, UPC server 12 also allows access to customers of product purchase and pricing information.

Figure 12:
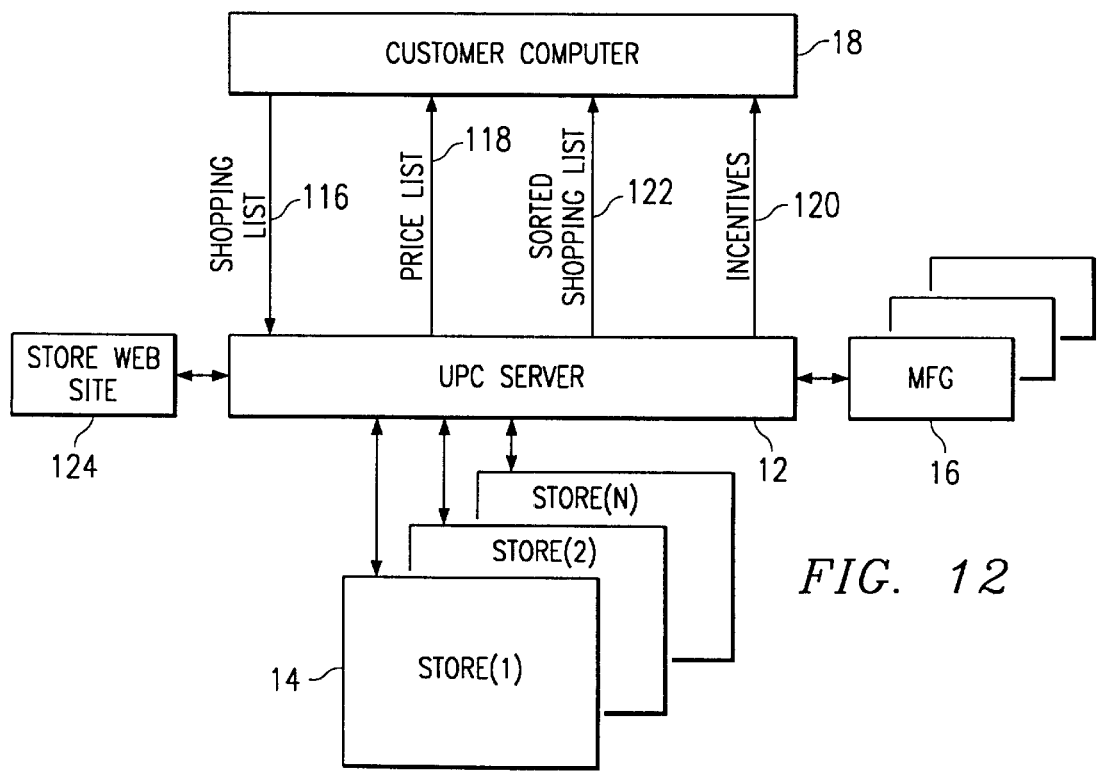
FIG. 12 illustrates a block diagram of a portion of the system of FIG. 1, showing the exchange of communication between a customer computer and a UPC server.

FIG. 12 illustrates a block diagram of a portion of system 10, showing the exchange of communication between customer computer 18 and UPC server 12. In this example, a user of customer computer 18 submits a shopping list to UPC server 12, as designated by arrow 116. In response, UPC server 12 submits a price list having the price of each item at each store 14 at which the user might shop, as designated by arrow 118. Therefore, by accessing UPC server 12, customers may determine at which store to shop for all items or for particular items. As an example, a customer selects one or more stores to price items and enters items to be priced. The customer's purchase history is used to aid the customer in selecting items for pricing.

As items are presented for pricing, deals can optionally be presented to the customer that are based on items being priced. For example, Brand A paper towels is presented in the customer's list for pricing, so a deal that is stored for Brand B paper towels is presented to the customer. The prices for the customer's items are accessed from each store's item list and presented to the customer in total. One or more of the stores may have discount rates stored based on a customer's spending level. For example, the customer spends an average of $135.00 per week at Store A, and Store A has stored in its pricing table that any customer spending on average $75.00 or more per week would be presented with an incentive of 5% on purchases totaling $50.00 to $75.00 and 8% on purchase totals that exceed $75.00. This discount would be factored in and presented to the customer. The customer would then print out the shopping list stored by retail aisle for that particular store to facilitate shopping efficiency. Alternatively, the list could be processed for home delivery.

Further, discounts may be electronically stored on UPC server 12 or a web site 124 associated with store 14 for subsequent access by the customer. The electronic discounts may also communicate to store 14 for application when the customer is identified purchasing the product associated with the discount. Alternatively, the electronic discounts may be made available to customer in a printed format by allowing customer computer to download a redeemable coupon stored on either a store web site 124 or UPC server 12. The customer may then print the redeemable coupon on a printer associated with customer computer 18. Such a coupon may include a unique identification number that is available at store 14 to prevent unlawful duplication of redeemable coupons. Once a coupon having a unique identification number is redeemed, no other coupons having that same number will be redeemed. Alternatively, a manufacturer may communicate product discounts to store web site 124, through UPC server 12, for viewing by customers.

Furthermore, when shopping list 116 is submitted, UPC server may offer to one or more manufacturers 16 the opportunity to provide incentives to the particular customer submitting a shopping list. For example, manufacturer 16 may wish to offer incentives to such a customer, the content of the incentive being directed to the manufacturer's competing product for a product submitted in the shopping list. The providing of such incentives is illustrated by arrow 120. In addition, UPC server 12 may communicate a sorted shopping list, which may or may not include customer incentives, that is configured according to the placement of the various items in a particular store 14, as designated by arrow 122. Thus, the customer may receive an e-mail displaying a map of the aisles of the store with the products provided by the customer in the shopping list at 116 indicated in a location corresponding to the actual location of the particular product in the store 14. Therefore, a particular customer may be more likely to visit a store in which a shopping list is provided showing the particular location of each item the customer desires. For example, a shopper may actually be a spouse or friend of the underlying purchaser, and may not typically frequent a particular store. Therefore, having a list identifying the particular location at which each particular item is offered for sale may induce a customer to use the services of a particular store rather than a different store.

Although the present invention and its advantages have been described in detail, it should be understood that various changes, substitutions, and alternatives can be made therein without departing from the spirit and scope of the present invention as defined by the appended claims. For example, an embodiment of the invention has been described in the context of utilizing UPC codes; however, it is explicitly contemplated that the teachings of the invention may be incorporated with other types of codes representative of products, including existing codes and codes yet to be developed.

What is claimed is:

1. A system for automatically adjusting the price of a product to respond to market conditions, the system comprising:
   an electronic cash register located in a store;
   a bar code scanner connected to the electronic cash register for detecting Uniform Product Codes of items purchased in a retail store;
   a printer connected to the electronic cash register for printing a description of the purchased items and associated prices;
   a first wedge disposed between the bar code scanner and the electronic cash register for providing the Uniform Product Codes of the purchased items to the Internet;
   a second wedge disposed between the electronic cash register and the printer for providing the associated prices of the purchased items to the Internet;
   a remote computer connected to the Internet, the computer comprising a processor, a storage medium connected to the processor, and a computer program stored on the storage medium, the remote computer located remote from the store in which the electronic cash register is located;
   an electronic price tag for displaying the price of a product, the electronic price tag located in the retail store proximate the first item;
   a communication link connecting the electronic price tag to the Internet; and
   wherein the computer program is operable when executed on the processor to initiate transmission of a signal indicative of a new price for the product over the Internet for receipt by the communication link.

2. The system of claim 1, wherein the computer program is further operable when executed on the processor to generate a new price for the product based on the detected Uniform Product codes of purchased items and the associated prices.

3. The system of claim 1, wherein the computer program is operable to receive an input indicative of a new price for the product.

4. The system of claim 1, wherein the communication link comprises a controller associated with the electronic price tag and a conductive medium connecting the controller to the electronic price tag.

5. The system of claim 2, and further comprising a telephone line connecting the controller to an Internet service provider.

6. The system of claim 1, wherein the communication link comprises a radio frequency transmitter for transmitting a signal for receipt by the electronic price tag.

7. The system of claim 2, wherein the computer program is further operable when executed on the processor to generate a price variation for the product based on the market share of the product in the retail store.

8. The system of claim 2, wherein the computer program is further operable when executed on the processor to generate a price variation for the product based on a predetermined change in the market share of the product in the retail store within a predetermined time period.

9. The system of claim 2, wherein the computer program is further operable when executed on the processor to generate a price variation for the product based on the price of a competing product, the competing product price received by the computer from the second wedge.

10. A method for adjusting a displayed price of an item in a retail store in response to a price of a competing item, comprising:
    receiving, at a remote computer located remote from the retail store, the price of the competing item and a code identifying the competing item that is purchased at a point-of-sale;
    determining, by the remote computer, a price of the item in response to receiving the price of the competing item; and
    transmitting, from the remote computer, the determined price of the item to an electronic price tag positioned near the item in the retail store.

11. The method of claim 10, wherein the code is a Uniform Product Code (UPC).

12. The method of claim 10, and further comprising coupling the remote computer to the Internet for receiving the price and the code of the competing item, and for transmitting the determined price to the electronic price tag.

13. The method of claim 10, and further comprising:
providing a tag controller; and
transmitting the determined price of the item to the electronic price tag through the tag controller.

14. The method of claim 13, and further comprising providing a conductive medium between the tag controller and the electronic price tag for transmitting the determined price of the item to the electronic price tag.

15. The method of claim 13, wherein transmitting the determined price of the item to the electronic price tag comprises transmitting over a conductive medium connecting the Internet to the tag controller.

16. The method of claim 13, further comprising providing a radio frequency transceiver for transmitting the determined price of the item to the electronic price tag.

17. The method claim 16, wherein transmitting the determined price of the item to the electronic price tag further comprises transmitting a radio frequency signal indicative of the determined price.

18. The method of claim 16, wherein transmitting the determined price of the item to the electronic price tag further comprises transmitting the determined price to the radio frequency transceiver located in the retail store.

19. The method of claim 18, wherein transmitting the determined price of the item to the electronic price tag further comprises transmitting the determined price to an electronic price tag controller and transmitting the determined price from the electronic price tag controller to the radio frequency transceiver.

20. The method of claim 10, wherein determining the price of the item in response to receiving the price of the competing item further comprises comparing the competing item's volume of purchases at the retail store to the item's volume of purchases at the retail store.

21. The method of claim 10, wherein determining the price of the item in response to receiving the price of the competing item further comprises automatically generating a price reduction if market share of the item at the retail store falls below a predetermined level.

22. The method of claim 10, wherein determining the price of the item in response to receiving the price of the competing item further comprises automatically generating a price reduction if a change in market share at the retail store over a predetermined time period falls below a predetermined level.

23. A method for price adjustment in marketing, comprising:
receiving point-of-sale information on a substantially real-time basis at a remote computer connected to the Internet, the point-of-sale information including the price of a competing item offered for sale at a retail store, the remote computer located remote from the retail store;
generating, in response to the point-of-sale information, a new price for a marketed item;
communicating the new price over the Internet, from the remote computer to an electronic price tag; and
wherein the competing item is competitive with the marketed item.

24. The method of claim 23 further comprising displaying the new price on the electronic price tag.

25. The method of claim 23, wherein the point-of-sale information further comprises an associated Uniform Product Code.

26. The method of claim 23, wherein generating the new price for the marketed item in response to the point-of-sale information further comprises comparing the price of the competing item to the marketed item.

27. The method of claim 23, wherein generating the new price for the marketed item in response to the point-of-sale information further comprises comparing the competing item's volume of purchases at the retail store to the marketed item's volume of purchases at the retail store.

28. The method of claim 23, wherein generating the new price for the marketed item in response to the point-of-sale information further comprises automatically generating, by the remote computer, a price reduction if market share of the marketed item at the retail store falls below a predetermined level.

29. The method of claim 23, wherein generating the new price for the marketed item in response to the point-of-sale information further comprises automatically generating, by the remote computer, a price reduction if change in market share at the retail store over a predetermined time period falls below a predetermined level.

30. The method of claim 23 further comprising receiving the point-of-sale information on a substantially real-time basis at the remote computer from a plurality of retail stores.

31. The method of claim 30, wherein generating the new price for the marketed item in response to the point-of-sale information further comprises generating, in response to the point-of-sale information from the plurality of retail stores, a price variation for the item.

32. The method of claim 23, wherein communicating, over a communication link between the Internet and the electronic price tag located in the retail store proximate to the item, further comprises transmitting a radio frequency signal indicative of the new price.

33. The method of claim 32, wherein communicating, over a communication link between the Internet and the electronic price tag further comprises communicating the new price to a radio frequency transceiver located in the retail store.

34. The method of claim 33, wherein communicating, over a communication link between the Internet and the electronic price tag further comprises communicating the new price to an electronic price tag controller and communicating the new price from the electronic price tag controller to the radio frequency transceiver.

35. The method of claim 34, wherein communicating, over a communication link between the Internet and the electronic price tag comprises communicating over a conductive medium connecting the Internet to the electronic price tag controller associated with the electronic price tag.

36. A method for making price adjustment in a retail store in response to a price of an item, comprising:
receiving, at a remote computer located remote from the retail store, the price of the item and a code identifying the item that is purchased at a point-of-sale;
determining, by the remote computer, a price of an associated item in response to receiving the price of the item, the associated item associated with the item; and
transmitting, from the remote computer, the determined price of the associated item to an electronic price tag located in the retail store.

37. The method of claim 36, wherein the associated item is competitive with the item.

38. The method of claim 36, wherein the associated item is a companion of the item.

39. The method of claim 36, wherein the associated item is a product that changes the item's effectiveness.

40. The method of claim 36, wherein the associated item is a product that alters the item's use.

41. A computerized system for marketing an item in a retail store in response to purchase information of a competing item, comprising:
 a terminal located in the retail store;
 a remote computer located remote from the retail store and coupled to the terminal, the remote computer comprising
  a storage medium,
  a processor coupled to the storage medium, and
  a computer program stored in the storage medium; and
 an electronic shelf tag located in the retail store proximate to the item and coupled to the remote computer, wherein the computer program is operable to receive the purchase information of the competing item that is purchased at a point-of-sale, determine a price of the item in response to receiving the purchase information of the competing item, and transmit the determined price of the item to the electronic shelf tag.

42. The system of claim 41, wherein the purchase information comprises a Uniform Product Code (UPC) of the competing item.

43. The system of claim 41, wherein the remote computer is coupled to the terminal by the Internet.

44. The system of claim 41, and further comprising a tag controller coupled to the electronic shelf tag.

45. The system of claim 44, and further comprising a conductive medium coupling the tag controller and the electronic shelf tag.

46. The system of claim 44, wherein a conductive medium couples the tag controller to the Internet.

47. The system of claim 44, and further comprising a radio frequency transceiver coupled to the tag controller, whereby the radio frequency transceiver transmits the determined price of the item to the electronic shelf tag.

48. The system of claim 47, and further comprising a radio frequency signal emanating from the radio frequency transceiver, the radio frequency signal indicating the determined price.

49. The system of claim 47, wherein the remote computer is operable to initiate transmission of the determined price to the radio frequency transceiver located in the retail store.

50. The system of claim 49, wherein the remote computer is operable to initiate transmission of the determined price to the tag controller.

51. The system of claim 41, wherein the computer program is further operable to determine the price of the item by comparing the competing item's volume of purchases at the retail store to the item's volume of purchases at the retail store.

52. The system of claim 41, wherein the computer program is further operable to automatically generate a price reduction for the item if market share of the item at the retail store falls below a predetermined level.

53. The system of claim 41, wherein the computer program is further operable to automatically generate a price reduction for the item if a change in market share at the retail store over a predetermined time period falls below a predetermined level.

54. A computerized system for promoting a marketed item in a retail store in response to a purchase information of a competing item, comprising:
 a terminal located in the retail store;
 a remote computer located remote from the retail store and coupled to the terminal, the remote computer comprising
  a storage medium,
  a processor coupled to the storage medium, and
  a computer program stored in the storage medium; and
 an electronic shelf tag located in the retail store proximate to the marketed item and coupled to the remote computer, wherein the computer program is operable to receive the purchase information on a substantially real-time basis, generate, in response to the purchase information, a new price for the marketed item, and communicate the new price over the Internet to the electronic shelf tag.

55. The system of claim 54, wherein the electronic shelf tag displays the new price.

56. The system of claim 54, wherein the purchase information comprises a Uniform Product Code and a price associated with the competing item.

57. The system of claim 56, wherein the computer program is further operable to compare the price of the competing item to the marketed item to generate the new price for the marketed item.

58. The system of claim 54, wherein the computer program is further operable to compare the competing item's volume of purchases at the retail store to the marketed item's volume of purchases at the retail store to generate the new price for the marketed item.

59. The system of claim 54, wherein the computer program is further operable to automatically generate, in response to the purchase information, a price reduction if market share of the marketed item at the retail store falls below a predetermined level.

60. The system of claim 54, wherein the computer program is further operable to automatically generate, in response to the purchase information, a price reduction if change in market share at the retail store over a predetermined time period falls below a predetermined level.

61. The system of claim 54, wherein the computer program is further operable to receive the purchase information from a plurality of retail stores.

62. The system of claim 61, wherein the computer program is further operable to generate a price variation for the marketed item in response to the purchase information from the plurality of retail stores.

63. The system of claim 54, wherein the remote computer is operable to initiate transmission of a radio frequency indicative of the new price of the marketed item to the electronic shelf tag.

64. The system of claim 63, and further comprising a radio frequency transceiver located in the retail store, the radio frequency transceiver coupled to the electronic shelf tag.

65. The system of claim 64, wherein the remote computer is coupled to an electronic shelf tag controller, the electronic shelf tag controller coupled to the radio frequency transceiver.

66. The system of claim 65, and further comprising a conductive medium that couples the electronic shelf tag controller to the Internet.

67. A computerized system for marketing an associated item in a retail store in response to a purchase information of an item, comprising:
 a terminal located in the retail store;
 a remote computer located remote from the retail store and coupled to the terminal, the computer comprising
  a storage medium,
  a processor coupled to the storage medium, and
  a computer program stored in the storage medium; and
 an electronic shelf tag located in the retail store proximate to the associated item and coupled to the remote computer, wherein the computer program is operable to receive the purchase information of the item that is purchased at a point-of-sale, determine a price of an associated item in response to receiving the purchase information of the item, the associated item associated with the item, and transmit the determined price of the associated item to the electronic shelf tag.

68. The system of claim 67, wherein the associated item is competitive with the item.

69. The system of claim 67, wherein the associated item is a companion of the item.

70. The system of claim 67, wherein the associated item is a product that changes the item's effectiveness.

71. The system of claim 67, wherein the associated item is a product that alters the item's use.

* * * * *

UNITED STATES PATENT AND TRADEMARK OFFICE
CERTIFICATE OF CORRECTION

PATENT NO.       : 6,993,498 B1                                     Page 1 of 4
APPLICATION NO.  : 09/360820
DATED            : January 31, 2006
INVENTOR(S)      : Deaton et al.

It is certified that error appears in the above-identified patent and that said Letters Patent is hereby corrected as shown below:

On the title page under References Cited, #56 U.S. Patent Documents, please insert:

| | | | |
|---|---|---|---|
| --3,792,437    | 02/12/74 | BLUMENTHAL et al. | 340/152 |
| 4,993,068     | 02/12/91 | PIOSENKA et al    | 380/23  |
| 5,719,382     | 02/17/98 | WHITE             | 235/375 |
| 5,887,271     | 03/23/99 | POWELL            | 705/14  |
| 5,918,211     | 06/29/99 | SLOANE            | 705/16  |
| 6,076,068     | 06/13/00 | DE LAPA et al.    | 705/14  |
| 6,141,010     | 10/31/00 | HOYLE             | 345/356 |
| US 6,292,786 B1 | 09/18/01 | DEATON et al.   | 705/14-- |

On the title page under References Cited, U.S. Patent Documents, please further insert:

| | | | |
|---|---|---|---|
| --4,745,468      | 05/17/88 | VON KOHORN       | 358/84  |
| B1 4,745,468     | 06/11/91 | VON KOHORN       | 358/84  |
| 4,876,592        | 10/24/89 | VON KOHORN       | 358/84  |
| 4,926,255        | 05/15/90 | VON KOHORN       | 358/84  |
| 5,034,807        | 07/23/91 | VON KOHORN       | 358/84  |
| 5,057,915        | 10/15/91 | VON KOHORN       | 358/84  |
| 5,128,752        | 07/07/92 | VON KOHORN       | 358/84  |
| 5,227,874        | 07/13/93 | VON KOHORN       | 358/84  |
| 5,283,734        | 02/01/94 | VON KOHORN       | 364/412 |
| 5,368,129        | 11/29/94 | VON KOHORN       | 186/52  |
| 5,508,731        | 04/16/96 | VON KOHORN       | 348/1   |
| 5,697,844        | 12/16/97 | VON KOHORN       | 463/40  |
| 5,713,795        | 02/03/98 | VON KOHORN       | 463/17  |
| 5,759,101        | 06/02/98 | VON KOHORN       | 463/40  |
| 5,515,098        | 05/07/96 | CARLES           | 348/8   |
| 6,129,274        | 10/10/00 | SUZUKI           | 235/381 |
| US 6,216,129 B1  | 04/10/01 | ELDERING         | 707/10  |
| US 6,236,985 B1  | 05/22/01 | AGGARWAL et al.  | 707/2   |
| US 6,317,722 B1  | 11/13/01 | JACOBI et al.    | 705/14  |
| 6,070,147        | 05/30/00 | HARMS et al.     | 705/14  |
| 6,076,070        | 06/13/00 | STACK            | 705/20  |
| US 6,314,406 B1  | 11/06/01 | O'HAGAN et al.   | 705/14  |
| US 6,330,543 B1  | 12/11/01 | KEPECS           | 705/14  |
| 6,021,362        | 02/01/00 | MAGGARD et al.   | 700/234 |
| 6,138,911        | 10/31/00 | FREDREGILL et al.| 235/383 |
| US 6,321,984 B1  | 11/27/01 | MCCALL et al.    | 235/381 |
| 5,832,456        | 11/03/98 | FOX et al.       | 705/10  |
| 5,907,350        | 05/25/99 | NEMIROFSKY       | 348/13  |

UNITED STATES PATENT AND TRADEMARK OFFICE
CERTIFICATE OF CORRECTION

PATENT NO. : 6,993,498 B1
APPLICATION NO. : 09/360820
DATED : January 31, 2006
INVENTOR(S) : Deaton et al.

It is certified that error appears in the above-identified patent and that said Letters Patent is hereby corrected as shown below:

| | | | |
|---|---|---|---|
| 5,918,214 | 06/29/99 | PERKOWSKI | 705/27 |
| US 6,246,997 B1 | 06/12/01 | CYBUL et al. | 705/27 |
| US 6,332,128 B1 | 12/18/01 | NICHOLSON | 705/14 |
| 5,483,049 | 01/09/06 | SCHULZE, Jr. | 235/383 |
| 5,850,446 | 12/15/98 | BERGER et al. | 380/24 |
| 6,061,660 | 05/09/00 | EGGLESTON et al. | 705/14 |
| US 6,249,772 B1 | 06/19/01 | WALKER et al. | 705/26 |
| US 6,336,099 B1 | 01/01/02 | BARNETT et al. | 705/14-- |

On the title page under References Cited, Foreign Patent Documents, please insert:

--JP 9101 988 A          04/15/97          Japan--

On the title page under References Cited, Foreign Patent Documents, please further insert:

--96/41289          12/19/96          WO
98/14921            04/09/88          WO--

On the title page under References Cited, Other Publications, please insert:

--Doan, Amy; "The shopper's wallet: more and more retailers are using rewards clubs to keep customers, generate marketing research," San Francisco Chronicle, pBl.
"Pioneer offers special finance options for 1999; new programs designed to aid crop producers following challenging year,: PR Newswire, p 3040.
U.S. Patent Application, Serial No. 09/420,639, entitled "Method and System for use in Generating an Advertisement Message," inventor(s) Deaton et al.
U.S. Patent Application, Serial No. 09/320,114, entitled "Method and System for Providing Customer Incentives Utilizing Dual Customer Identifications," inventor(s) Deaton et al.
U.S. Patent Application, Serial No. 09/378,779, entitled "Method and System for Providing Customer Incentives Utilizing Dual Customer Identifications," inventor(s) Deaton et al.
U.S. Patent Application, Serial No. 09/376,545, entitled "Method and System for Providing Customer Incentives at the Point-of-Sale," inventor(s) Deaton et al.
U.S. Patent Application, Serial No. 09/395,306, entitled "Method and System for Providing Customer Incentives Utilizing Dual Customer Identifications and Selected Products," inventor(s) Deaton et al.
U.S. Patent Application, Serial No. 09/375,603, entitled "Method and System for Providing Customer Incentives Utilizing Dual Customer Identifications and Differentiated Incentives," inventor(s) Deaton et al.--

UNITED STATES PATENT AND TRADEMARK OFFICE
CERTIFICATE OF CORRECTION

| | | |
|---|---|---|
| PATENT NO. | : 6,993,498 B1 | Page 3 of 4 |
| APPLICATION NO. | : 09/360820 | |
| DATED | : January 31, 2006 | |
| INVENTOR(S) | : Deaton et al. | |

It is certified that error appears in the above-identified patent and that said Letters Patent is hereby corrected as shown below:

U.S. Patent Application, Serial No. 09/396,838, entitled "Method and System for Providing Customer Incentives Utilizing Communication of Selected Product Incentives," inventor(s) Deaton et al.
U.S. Patent Application, Serial No. 09/398,123, entitled "Method and System for Customer Promotion," inventor(s) Deaton et al.
U.S. Patent Application, Serial No. 09/405,675, entitled "Method and System for Customer Promotion," inventor(s) Deaton et al.
U.S. Patent Application, Serial No. 09/416,859, entitled "Method and System for Differentiated Customer Promotion," inventor(s) Deaton et al.
U.S. Patent Application, Serial No. 09/411,588, entitled "Method and System for Differentiated Customer Promotion," inventor(s) Deaton et al.
U.S. Patent Application, Serial No. 09/414,830, entitled "Method and System for Differentiated Customer Promotion," inventor(s) Deaton et al.
U.S. Patent Application, Serial No. 09/414,829, entitled "Method and System for Differentiated Customer Promotion," inventor(s) Deaton et al.
U.S. Patent Application, Serial No. 09/372,412, entitled "Method and System for Facilitating Consumer Purchases," inventor(s) Deaton et al.
U.S. Patent Application, Serial No. 09/372,356, entitled "Method and System for Coupon Redemption Verification and Crediting," inventor(s) Deaton et al.
U.S. Patent Application, Serial No. 09/372,376, entitled "Method and System for Responding to Market Conditions," inventor(s) Deaton et al.
U.S. Patent Application, Serial No. 09/372,452, entitled "Method and Apparatus for Filtering Point-of-Sale Information," inventor(s) Deaton et al.
U.S. Patent Application, Serial No. 09/372,451, entitled "Method and System for Compiling a Plurality of Incentives Directed to a Common Recipient," inventor(s) Deaton et al.
U.S. Patent Application, Serial No. 09/372,446, entitled "Method and System for Price Reduction Reconciliation," inventor(s) Deaton et al.
U.S. Patent Application, Serial No. 09/885,045, entitled "Method and System for Generating Incentives in Response to Substantially Real-Time Product Purchase Information," inventor(s) Deaton et al.--

UNITED STATES PATENT AND TRADEMARK OFFICE
CERTIFICATE OF CORRECTION

PATENT NO.         : 6,993,498 B1
APPLICATION NO. : 09/360820
DATED               : January 31, 2006
INVENTOR(S)      : Deaton et al.

It is certified that error appears in the above-identified patent and that said Letters Patent is hereby corrected as shown below:

On the title page under References Cited, Other Publications, please further insert:

--SSDS Inc., and Inter-Act Systems implement new "clipless" coupon program in major grocery stores in the Northeast. *Business Wire*, p. 9041023.
Web-Based Couponing, Ads Tested at Ranthils (Randalls Food Markets tests link to web sites that offers a customized virtual store in which customers can find store specials and download coupons); *Supermarket News*, v. 47, n. 22, p. 25+,
Forger, Gary, "Real-time Control Drives JIT Success," *Modern Materials Handling*; Boston; Vol. 47, Issue 12, extracted on Internet from Proquest database, http://proquest.umi.com on 02/25/2002.
"Focus on general merchandise", *Supermarket News*, v35, pS4(20).--

Signed and Sealed this

Twenty-first Day of November, 2006

JON W. DUDAS
*Director of the United States Patent and Trademark Office*